United States Patent Office 3,732,328
Patented May 8, 1973

3,732,328
PROCESS FOR THE PRODUCTION OF
OCTADIENES
Donald Wright, Stockton-on-Tees, England, assignor to
Imperial Chemical Industries Limited, London, England
No Drawing. Filed Oct. 8, 1970, Ser. No. 79,323
Claims priority, application Great Britain, Oct. 17, 1969,
51,151/69; Apr. 28, 1970, 20,368/70; July 27, 1970,
36,198/70
Int. Cl. C07c 11/12
U.S. Cl. 260—680 B
6 Claims

ABSTRACT OF THE DISCLOSURE

A process for the production of an octadiene selected from the group consisting of octa-1,6-diene, octa-1,7-diene, monomethylocta-1,6-diene, monomethylocta-1,7-diene, dimethylocta-1,6-diene and dimethylocta-1,7-diene which comprises contacting butadiene and/or isoprene at a temperature of 20 to 200° C. with a $10^{-1}$ to $10^{-5}$ molar concentration of a platinum, palladium, or ruthenium compound selected from the group consisting of halides, alkanoates containing up to 6 carbon atoms, acetylacetonates, bisbenzonitrile palladium (II) and lithium palladous chloride, in a polar solvent and in the presence of formic acid.

The present invention relates to the production of olefines.

According to the invention 1,6- and/or 1,7-octadienes are produced by contacting one or more acyclic conjugated diolefines with metallic platinum, palladium, rhodium, ruthenium or osmium or with a compound of one or more of these metals in a polar solvent in the presence of a reducing agent.

The acylic conjugated diolefine contains the structure:

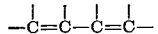

in which the residual valencies may be satisfied by organic or inorganic groups or by hydrogen. Preferably the residual valencies are substituted by alkyl groups, particularly lower alkyl groups containing up to four carbon atoms, or by hydrogen. The most suitable acyclic conjugated diolefines for use in the process of the invention are those in which the residual valencies are satisfied by methyl groups and/or by hydrogen. Butadiene and isoprene are particularly preferred. Halogen atoms such as chlorine are examples of suitable inorganic substituents in the acyclic conjugated diolefine. If desired two or more diolefines may be used in admixture.

The products of the process are substantially acyclic dimers of the acyclic conjugated diolefines and comprise an octadiene chain in which unsaturation is present in the 1,6- or 1,7-position. Thus platinum or a platinum compound tends to produce both the 1,6- and the 1,7-isomer whereas palladium or a palladium compound tends to produce a product comprising substantially the 1,6-isomer without any of the 1,7-isomer. If the process is carried out in the presence of a palladium compound and a phosphine such as triphenyl phosphine however, then the nature of the product is changed to a mixture of both 1,6- and 1,7-isomers.

The reaction may be carried out heterogeneously using the metal or a metal compound. In the heterogeneous reaction the metal or metal compound may be supported on an inert support such as silica, alumina, charcoal or pumice. Preferably, however, the reaction is carried out homogeneously in the liquid phase. Suitable noble metal compounds which may be used in both the homogeneous and heterogeneous reactions include metal halides, particularly the chlorides, e.g. platinous chloride rhodium trichloride and palladous chloride; metal carboxylates, particularly metal alkanoates containing up to six carbon atoms such as platinous acetate and palladium acetate, and complexes of the metals such as platinum or palladium acetylacetonate, bis-benzonitrile palladium (II) and lithium palladous chloride. The concentration of the metal or metal compound is preferably catalytic, e.g. in the range $10^{-1}$ to $10^{-5}$ molar, preferably $10^{-2}$ to $10^{-4}$ molar.

Polar solvents which may be used in the process of the present invention include nitriles such as benzonitrile and acetonitrile, dialkyl sulphoxides such as dimethyl sulphoxide, sulphones such as sulpholane, esters such as benzyl acetate and dinonylphalate, ethers such as the lower alkyl ethers of mono- or diethylene glycol, amides such as acetamide and benzamide mono-substituted amides such as N-methyl acetamide and di-substituted amides such as dimethylacetamide, and in particular dimethyl formamide.

The reducing agent is preferably a liquid reducing agent miscible with the polar solvent. Examples of such agents include hydrazine and formaldehyde and solutions containing an alcohol particularly a lower alkanol such as isopropanol. A preferred reducing agent is formic acid. The concentration of the reducing agent is preferably in the range 0.5 to 10 molar. A gaseous reducing agent such as hydrogen may also be used.

The process may be carried out at a temperature in the range 20 to 200° C. When operating at the higher temperatures the reaction may take place in a sealed system under the autogeneous pressure of the reactants.

If the process is carried out in a steel reaction vessel then it is advantageous to provide a copper salt, e.g. copper sulphate, or a copper halide such as copper chloride or a copper alkanoate such as copper acetate, or a phosphine such as a trialkyl, a mixed alkylaryl or a triaryl phosphine, e.g. triphenyl phosphine in the reaction medium to improve the activity of the catalyst and to prolong its life.

The product of the process is either a 1,6 or 1,7 octadiene or a mixture of the two. The terminal unsaturation in the 1:7 diolefine makes it particularly useful as a chemical intermediate while the 1:6-isomer finds use as a termonomer with ethylene and propylene in EP rubbers.

The invention will now be further described with reference to the following examples.

EXAMPLE 1

Formic acid (12 grams, 0.26 mole), dimethylformamide (20 mls.), platinum acetylacetonate (39 mg., 0.0001 mole) and 1,3-butadiene (50 mls., 0.63 mole) were heated in an autoclave at 100° C. for 3 hours. The reaction product was cooled, diluted with water and the organic phase separated and distilled at 45° C./60 mm. The yield was 11.5 grams of octadiene consisting of approximately equal amounts of the 1,6- and 1,7-isomers.

EXAMPLE 2

Formic acid (12 grams), dimethylformamide (20 ml.), platinous chloride (27 mg., $10^{-4}$ mole) lithium chloride (8 mg., $2 \times 10^{-4}$ mole) and butadiene (60 mls.) were heated in an autoclave at 100° C. for 3 hours. Separation of the product gave 4.5 g. of hydrocarbon of which 80% was 1,7-octadiene (the residue being approximately 10% each of 1,6-octadiene and vinyl-cyclohexene).

EXAMPLE 3

Formic acid (48 grams, 1.044 mole), dimethylformamide (80 mls.), palladous acetylacetonate (0.12 gram, 0.00038 mole) and butadiene (190 mls., 2.4 mole) were heated in an autoclave at 100° C. for 3 hours. The reaction product was cooled, diluted with water and the organic phase distilled at 60° C./95 mm. The yield was 12.5 grams of a product consisting of 94% 1,6-octadiene and 6% vinyl cyclohexene.

The conversion of formic acid was estimated by titration to be 22%, the yield of 1,6-octadiene based on formic acid converted being 48%.

EXAMPLE 4

Example 3 was repeated replacing the palladous acetylacetonate by palladous chloride (0.0004 mole) and lithium chloride (0.0008 mole), the catalyst being lithium palladous chloride formed in situ. The yield was 7.0 grams of 1,6-octadiene and 1 gram vinyl cyclohexene.

EXAMPLE 5

Formic acid (12 grams, 0.26 mole), dimethylformamide (20 mls.), palladous acetate (20 mgrams, 0.00009 mole) and isoprene (41 grams, 0.60 mole) were held at 40° C. for 18 hours. The product was cooled, diluted with water and the hydrocarbon layer distilled. A fraction boiling at 58° C. at 20 mm. (0.8 gram) was shown by nuclear-magnetic-resonance and gas-liquid chromatographic techniques to be 3,7-dimethyl octadiene-1,6.

EXAMPLE 6

Formic acid (12 grams, 0.26 mole) dimethylformamide (20 mls.), palladous acetate (19 mgrams, 0.000085 mole), butadiene (25 mls. 0.32 mole) and isoprene (20 grams, 0.29 mole) were held at 40° C. for 22 hours in an autoclave. Addition of water followed by distillation of the organic layer at 80° C./120 mm. produced 2.8 grams of a mixture of 2 parts of octadiene-1,6 and 1 part of 3-methyl octadiene-1,6.

EXAMPLE 7

Dimethylformamide (20 mls.) containing ruthenium trichloride (21 mgrams, 0.00008 mole) and butadiene (60 mls., 0.75 mole) was shaken in an autoclave for 3 hours at 100° C. under 10 atmospheres pressure of hydrogen. The reaction product was diluted with water and the organic phase distilled to give a fraction boiling at 45° C./20 mm. which was shown by gas-liquid chromatography to contain octadiene-1,6.

EXAMPLE 8

A solution of potassium hydroxide (1.0 gram) in methanol (30 mls.) containing platinous acetylacetonate (0.056 gram, 0.00014 mole) was shaken in an autoclave for 3 hours at 100° C. with butadiene (50 mls.). After dilution of the reaction product with water the organic layer was distilled at 65° C./100 mm. to give a fraction which was shown by gas-liquid chromatography to contain octadiene-1,6 and octadiene-1,7.

EXAMPLE 9

A solution consisting of formic acid (10 mls.), butadiene (50 mls.), sulpholane (20 mls.) and palladous acetylacetonate (0.0383 gram, 0.12 mmole) was shaken in an autoclave for 3 hours at 100° C. The reaction product was diluted with water and the organic phase distilled to give 1.5 grams of octadiene-1,6.

EXAMPLE 10

A mixture of formic acid (12 grams, 0.26 mole) dimethylformamide (20 mls.), palladous acetate (22 mgram, 0.0001 mole), cupric acetate (0.36 gram) and butadiene (25 grams) was held at 55° C. for 20 hours in a stainless steel autoclave. After cooling and adding water the organic phase was distilled at 65° C./115 mm. to give 9.7 grams of octadiene-1,6.

In the absence of the cupric acetate only 2 grams of octadiene-1,6 were obtained.

EXAMPLE 11

A mixture of formic acid (12 grams, 0.26 mole) dimethylformamide (20 mls.) palladous acetate bis(triphenyl phosphine) complex (66 mgram, 0.000088 mole) and butadiene (30 grams) was heated in an autoclave at 100° C. for 4 hours. Addition of water followed by distillation gave a yield of 12.0 grams of a mixture of octadiene-1,6 and octadiene-1,7 in a ratio of 2:1. In the absence of the triphenyl phosphine only 2.0 grams of the octadiene-1,6 were obtained.

EXAMPLE 12

A mixture of formic acid (12 grams, 0.26 mole), dimethylformamide (20 mls.), palladous acetate (0.21 gram, 0.000092 mole) and butadiene (50 mls., 0.63 mole) was shaken in an autoclave at 40° C. for 22 hours. The mixture was then diluted with water and the organic phase distilled at 60° C./95 mm. The yield was 19.8 grams of octadiene-1,6 and the conversion of formic acid was 78.5%. The yield of octadiene based on formic acid converted was 88% and octadiene was produced at a rate of 1950 moles per mole palladium.

EXAMPLE 13

A mixture of formic acid (12 grams), dimethylsulphoxide (20 mls.), palladous acetylactonate (0.35 gram, 0.00012 mole) and butadiene (50 mls.) was shaken in an autoclave at 100° C. for 1 hour. The mixture was next diluted with water and the organic phase finally distilled at 68° C./100 mm. The yield was 12.4 grams consisting of 60% octadiene-1,6 and 38% vinyl cyclohexene.

EXAMPLE 14

A mixture of formic acid (12 grams 0.26 mole), dimethyl formamide (20 mls.), palladous acetate (22 mgram, 0.0001 mole) copper sulphate (0.93 gram) and butadiene (30 grams) was held at 50° C. for 20 hours in a stainless steel autoclave. After cooling and adding water the organic phase was distilled at 65° C./115 mm. to give 15.2 grams of octadiene-1,6.

I claim:

1. A process for the production of an octadiene selected from the group consisting of octa-1,6-diene, octa-1,7-diene, monomethylocta-1,6-diene, monomethylocta-1,7-diene, dimethylocta-1,6-diene and dimethylocta-1,7-diene which comprises contacting butadiene and/or isoprene at a temperature of 20 to 200° C. with a $10^{-1}$ to $10^{-5}$ molar concentration of a platinum, palladium, or ruthenium compound selected from the group consisting of halides, alkanoates containing up to 6 carbon atoms, acetylacetonates, bisbenzonitrile palladium (II) and lithium palladous chloride.

2. The process of claim 1 in which the process is carried out homogeneously in the liquid phase.

3. The process of claim 2 in which the polar solvent is selected from the group consisting of nitriles, dialkyl sulphoxides, sulphones, esters, ethers, amides, mono-substituted amides and disubstituted amides.

4. The process of claim 2 when carried out in a steel reaction vessel in which a copper salt or a phosphine is present.

5. The process of claim 2 in which isoprene or butadiene is contacted at a temperature of 20 to 200° C. with, (a) a $10^{-1}$ to $10^{-5}$ molar concentration of a metal compound selected from the group consisting of palladous chloride, platinous chloride, a palladous alkanoate containing up to 6 carbon atoms, a platinous alkanoate containing up to 6 carbon atoms, platinum acetylacetonate, palladium acetylacetonate, bisbenzonitrile palladium (II) and lithium palladous chloride, (b) in a polar solvent selected from the group consisting of benzonitrile, acetonitrile, dimethylsulphoxide, sulpholane, benzyl acetate, dinonylphthalate, acetamide, benzamide, N-methylacetamide, dimethyl acetamide, dimethyl formamide, a lower alkyl ether of monoethylene glycol and a lower alkyl ether of diethylene glycol, and (c) in the presence of formic acid in a concentration of 0.5 to 10 molar.

6. The process of claim 5 when carried out in a steel reaction vessel in which a copper salt or triphenylphosphine is present.

References Cited
UNITED STATES PATENTS

| | | | |
|---|---|---|---|
| 3,221,045 | 11/1965 | McKeon et al. | 260—497 |
| 3,361,840 | 1/1968 | Kohll et al. | 260—683.15 |
| 3,373,219 | 3/1968 | Kronig et al. | 260—681.5 |
| 3,437,676 | 4/1969 | Von Kutepow et al. | 260—468 |
| 3,510,536 | 5/1970 | Brennan | 260—680 |
| 3,655,791 | 4/1972 | De Young | 260—680 X |
| 3,444,258 | 5/1969 | Kohnle et al. | 260—677 R |
| 3,488,400 | 1/1970 | Candlin et al. | 260—677 H |
| 3,534,088 | 10/1970 | Bryant et al. | 260—677 R |
| 3,541,177 | 11/1970 | Hagihara et al. | 260—677 R |
| 3,321,543 | 5/1967 | Henle | 260—680 R |

PAUL M. COUGHLAN, Jr., Primary Examiner

U.S. Cl. X.R.

252—431 C; 260—666 B

UNITED STATES PATENT OFFICE
CERTIFICATE OF CORRECTION

Patent No. 3,732,328　　　　　　　Dated May 8, 1973

Inventor(s)　　Donald Wright

It is certified that error appears in the above-identified patent and that said Letters Patent are hereby corrected as shown below:

Claim 1, at the end of the claim, add

--, in a polar solvent and in the presence of formic acid--.

Signed and sealed this 1st day of January 1974.

(SEAL)
Attest:

EDWARD M. FLETCHER, JR.　　　　RENE D. TEGTMEYER
Attesting Officer　　　　　　　Acting Commissioner of Patents